March 29, 1949.  B. FERRAR  2,465,640
RESILIENT WHEEL
Filed March 1, 1944
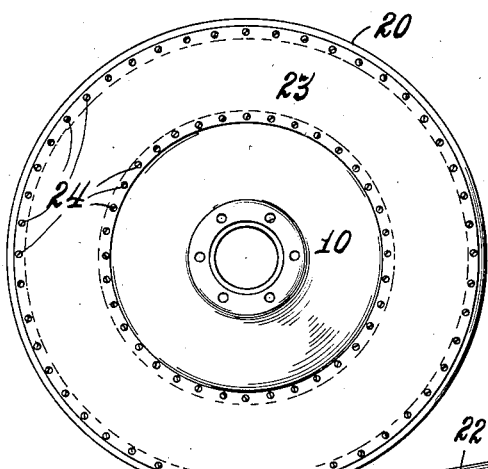
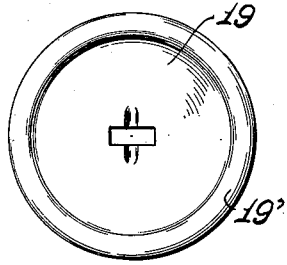
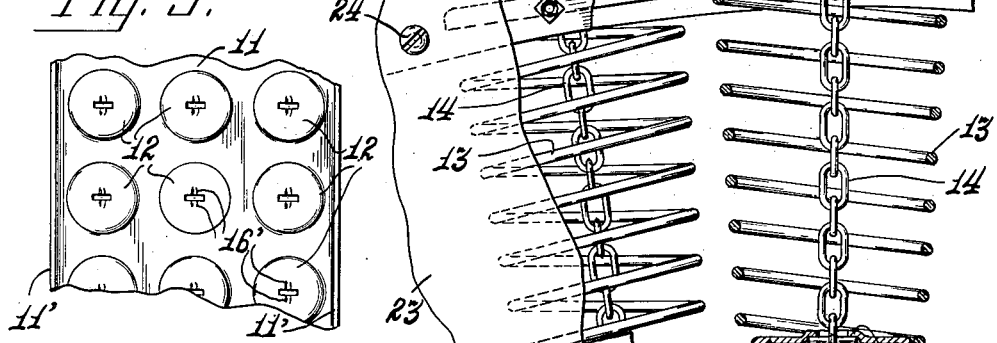
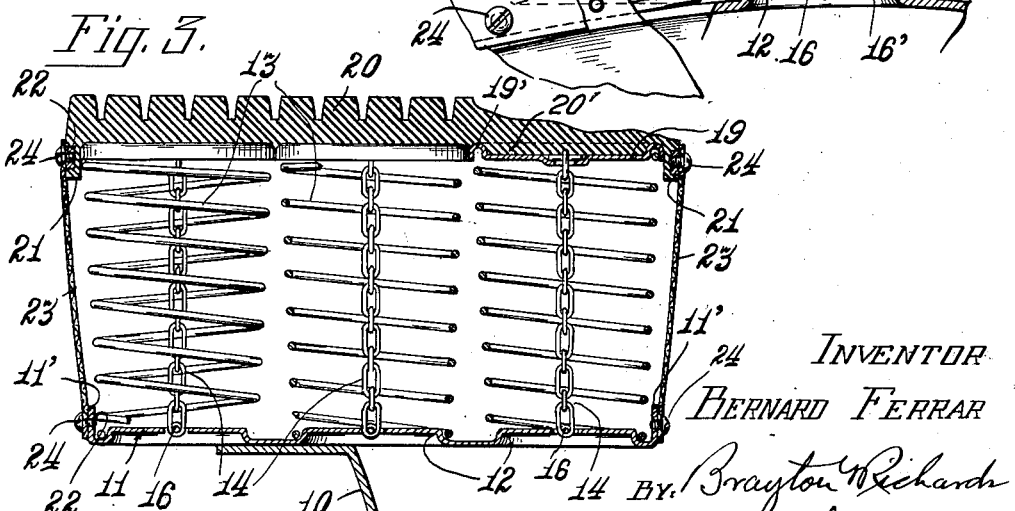
INVENTOR
BERNARD FERRAR
BY Brayton Richards
ATTORNEY Patented Mar. 29, 1949

2,465,640

UNITED STATES PATENT OFFICE 2,465,640

RESILIENT WHEEL

Bernard Ferrar, Chicago, Ill.

Application March 1, 1944, Serial No. 524,517

3 Claims. (Cl. 152—293)

The invention relates to improvements in resilient wheels and has for its primary object the provision of an improved wheel of this character which is of simple construction and highly efficient in use.

Other objects will appear hereinafter.

The invention consists of the combinations and arrangements of parts hereinafter described and claimed.

The invention will be best understood by reference to the accompanying drawings forming a part of this specification and in which—

Fig. 1 is a side view of a wheel embodying the invention;

Fig. 2, an enlarged partial longitudinal section taken through the outer portion of the wheel;

Fig. 3, a transverse section of the outer portion of the wheel;

Fig. 4, a top plan view of one of a plurality of caps employed in the construction; and Fig. 5, a plan view of a portion of the wheel rim.

The embodiment of the invention as illustrated in the drawings comprises an inner body portion 10 of any usual or any desired construction, as indicated, and provided with a peripheral bearing rim 11 secured to said body portion as indicated. The rim 11 is provided at its edges with radial extending flanges 11' and a plurality of bosses 12 adapted to fit into the rim ends of a plurality of inwardly tapered coiled springs 13 secured radially to said rim between said flanges. Each of the springs 13 is placed under suitable initial compression and its expansion individually limited by means of a chain 14 positioned centrally thereof. Each chain has its inner link extended through a corresponding slot in the rim 11 and engaged by holding pin 16 seating in recess 16', and each outer link 17 is similarly secured by means of a pin 18 to the central portion of a cap 19 provided with a peripheral channel 19' fitting, as shown, over the outer portion of each spring. A rubber tread member 20 which may be of the same consistency and design as the tread portion of an ordinary pneumatic tire, is arranged around said springs as shown, to constitute the normal tread member of the wheels and is provided with inwardly extending bosses 20' fitting into recesses in the outer sides of the caps 19 to hold the tread in place. The tread member 20 is provided at its sides with inwardly extending flanges 21 carrying nut members 22 and similar threaded openings are provided on the flanges 12. Flexible closure members 23 of canvas or similar material are held in place by screws 24 arranged to engage the nut members 22 and said threaded openings, and thus secure the same in place on opposite sides of the springs 13 and enclose the same to prevent access of dust and dirt.

As will be noted, the springs 13 are both circumferentially and transversely spaced from each other and are capable of individually yielding without materially affecting adjacent springs, so that as the wheel runs upon the roadway, rocks or other small obstructions contacting the same will compress the individual spring or springs thereover without affecting adjacent springs, thus insuring smooth running of the wheel over comparatively rough surfaces. By this construction a resilient wheel is provided which will operate substantially with the same resiliency and tread as the ordinary pneumatic tire and, of course, will be free of danger of punctures or blowouts.

The specific form and arrangement of parts disclosed is a simple and effective one for the purpose.

While I have illustrated and described the preferred form of construction for carrying the invention into effect, this is capable of variation and modification without departing from the spirit of the invention. I therefore do not wish to be limited to the precise details disclosed, but desire to avail myself of such variations and modifications as fall within the scope of the appended claims.

I claim:

1. A resilient wheel comprising a periferal bearing rim having radially extending side flanges; a plurality of rows of transversely arranged bosses in spaced and axial alignment between said side flanges; an outer circular tread member constructed of rubber or the like having a plurality of rows of inwardly projecting bosses in radial alignment with said bearing rim bosses; a helical expansion spring of outwardly expanding circumferences mounted between each of said bosses carried in alignment by said bearing rim and said circuit or tread member; axially aligned restraining means limiting the expansion thereof arranged within each spring and connected to a cap adapted to engage the large end of said expansion spring; and flexible closure members of annular form each attached at its inner marginal edge to one of said side flanges, and at its outer marginal edge to said circular tread member.

2. The construction specified in claim 1 in which the said tread member is radially flexible relative to said peripheral bearing rim.

3. The construction specified in claim 1 in which the said flexible closure members are attached to said tread member by screw elements carried by said tread member.

BERNARD FERRAR.

REFERENCES CITED

The following references are of record in the file of this patent:

UNITED STATES PATENTS

| Number | Name | Date |
| --- | --- | --- |
| 542,678 | Freese | July 16, 1895 |
| 925,005 | Marr | June 15, 1909 |
| 927,676 | Pollard | July 13, 1909 |
| 1,058,593 | Jenness | Apr. 8, 1913 |
| 1,240,059 | Knowlton | Sept. 11, 1917 |
| 1,301,467 | Lorenz | Apr. 22, 1919 |
| 1,413,608 | Overboe | Apr. 25, 1922 |
| 1,696,059 | Schraner | Dec. 18, 1928 |

FOREIGN PATENTS

| Number | Country | Date |
| --- | --- | --- |
| 212,090 | Germany | 1909 |